United States Patent Office 3,546,922
Patented Dec. 15, 1970

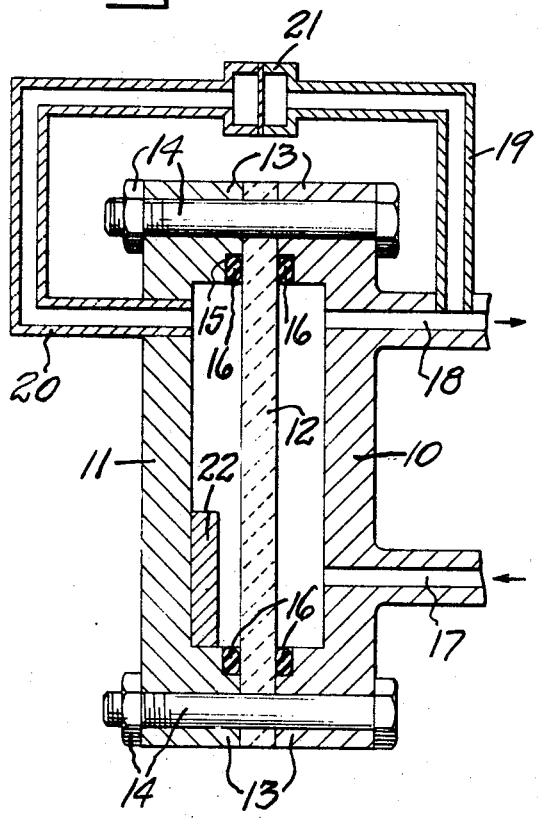
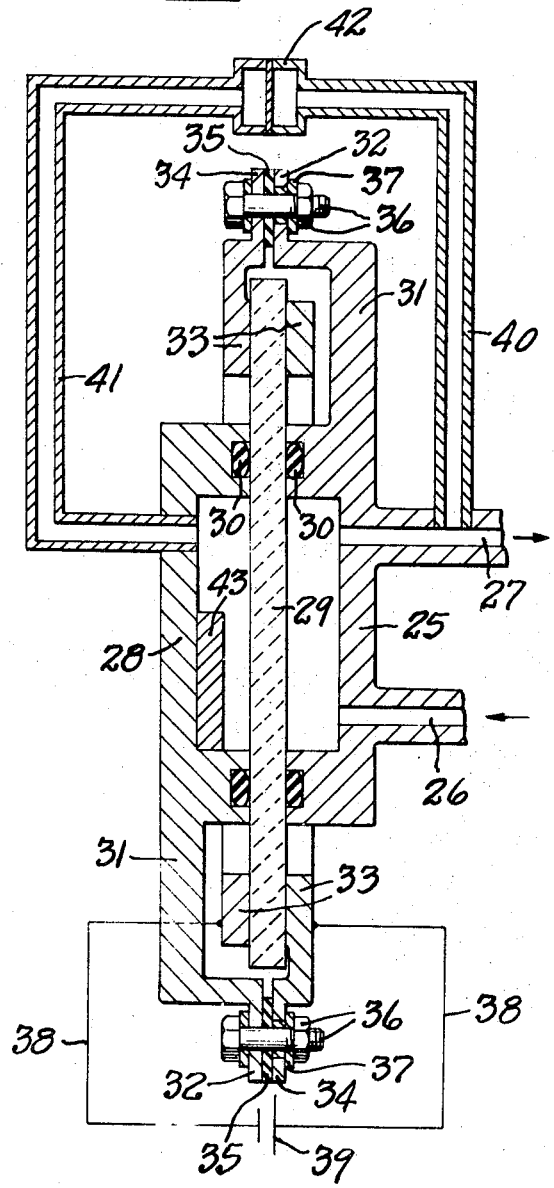

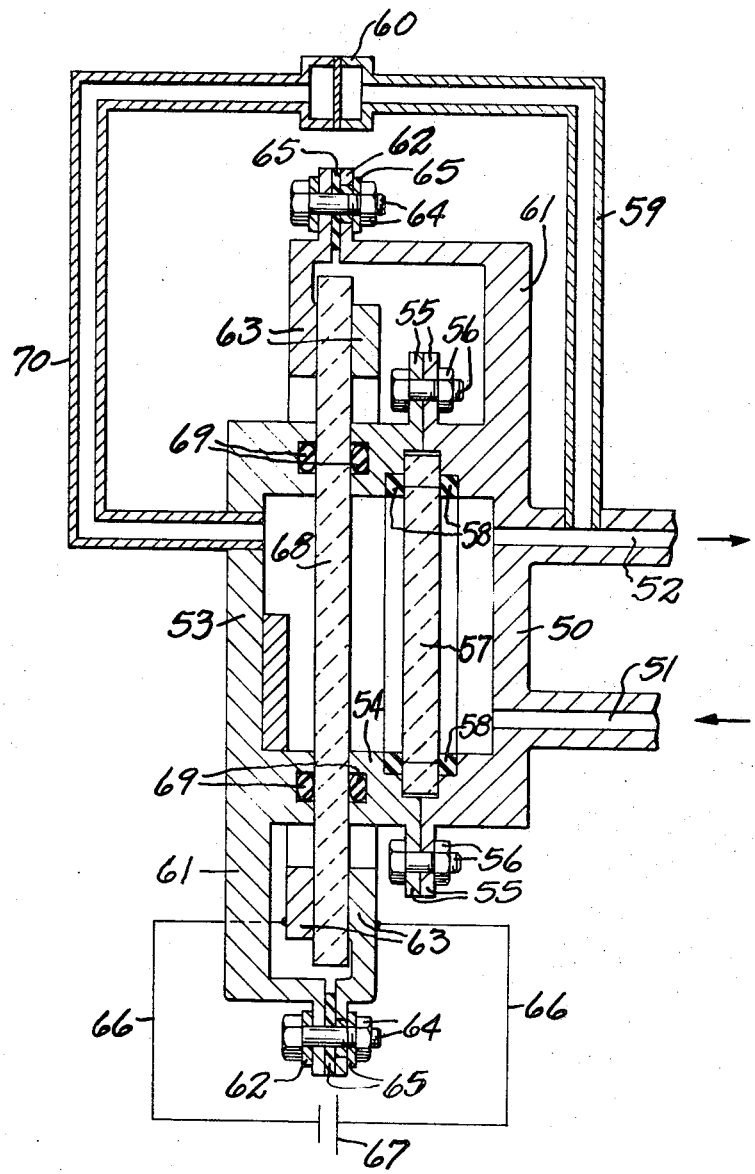

3,546,922
METHOD AND MEANS FOR ANALYZING LOW MOISTURE CONCENTRATION IN GASES
Hubert Dreckmann, Michigan City, Ind., assignor to The Hays Corporation, Michigan City, Ind., a corporation of Indiana
Filed July 26, 1968, Ser. No. 747,851
Int. Cl. B01d *59/10;* G01n *31/00*
U.S. Cl. 73—29　　　　　　　　　　　　　5 Claims

ABSTRACT OF THE DISCLOSURE

A method for measuring the moisture content of a gas by exposing a sample gas to a membrane permeable by the gas and measuring the pressure difference between the gas sample and the moisture-free gas which has penetrated the membrane.

Apparatus for measuring the moisture content of the gas which uses a housing having two chambers which are separated by a gas-permeable membrane and which are connected to a differential pressure detector. One chamber has gas inlet and outlet means.

SUMMARY OF THE INVENTION

This invention relates to method and means for analyzing low moisture concentration in gases.

It is frequently desirable to ascertain the moisture content of gas, particularly, in cases where moisture content is subject to variations or fluctuations which are indicative of certain operating conditions in a process under control, such as the efficiency of the process. In some instances process control requires continuous determination of the percentage of moisture content of the gases produced in the process. Measurement of moisture concentration has been difficult and time consuming by the previous methods and apparatus, and in some instances has not been capable of performance on a continuous basis.

It is a primary object of this invention to provide a novel method and means for analyzing low moisture concentration in gases by a continuous operation whose results are continuously measured and quickly observable by an operator.

A further object is to provide a method by which gas is passed in a selected path of flow through a chamber spanned by a membrane which is permeable only by gas and not by moisture, whereby gas alone passes into a second chamber, and then measuring the difference in pressure of the gases in the two chambers at opposite sides of the membrane.

A further object is to provide a method of this character by which a portion of gas flowing through one chamber is permitted to permeate through a membrane into a second chamber which contains moisture absorbing means, and then measuring the difference in gas pressure in the two chambers.

A further object is to provide an apparatus of this character wherein a chamber is spanned by a diaphragm which is permeable by gases, but not by moisture, which chambers are connected with means for measuring the differential of pressures therein.

A further object is to provide a method and means of this character which is accurate in operation, easily operated by inexperienced help and which is accurate and trouble free.

Further objects will be apparent from the following specifications.

BRIEF DESCRIPTION OF THE DRAWINGS

FIG. 1 is a sectional view illustrating one embodiment of the invention.
FIG. 2 is a sectional view illustrating another embodiment of the invention.
FIG. 3 is a sectional view illustrating a third embodiment of the invention.

DESCRIPTION OF THE PREFERRED EMBODIMENT

Referring to the drawings, and particularly to FIG. 1, the numeral 10 designates one cup-shaped part of a housing which is secured to and cooperates with a second cup-shaped housing part 11 to define a hollow housing structure having a cavity which is spanned and divided by membrane 12. The housing parts 10 and 11 preferably have complementary, comparatively thick marginal wall portions 13. The membrane 12 is preferably clamped between the marginal wall portions 13 which are interconnected by securing members 14, such as cooperating nuts and bolts. Each housing marginal wall portion preferably has an inner marginal recess defining a step at 15 in which is seated a marginal gasket 16 providing an effective gas-tight seal around the housing cavity at each face of membrane 12.

The membrane 12 is semi-permeable, in that it passes therethrough freely all gases, but impedes the diffusion of water vapor therethrough. Various materials are available having such properties, one of which is fluorinated vinyl, an example of which is known as "V F Metricel" produced by Gelman Instrument Company of Ann Arbor, Mich. Another material found suitable is microporous film produced by Reeves Bros. Inc., of New York, N.Y., and sold under the trademark "Reevair."

The housing part 10 has an inlet port 17 and an outlet port 18 formed therein at spaced points and may have suitable nipples or fittings to which may be connected inlet and outlet lines (not shown). Both ports 17 and 18 communicate with the chamber within the housing at one side of membrane 12, as at the right-hand side as shown and are so positioned that gas flowing in the right-hand chamber from the inlet to the outlet impinges on the membrane 12.

A conduit 19 communicates with the right-hand chamber and is here shown as branching from the outlet port 18. A conduit 20 communicates with the chamber or left portion of the cavity of the housing opposite that with which the outlet port 18 communicates. The two conduits 19 and 20 are connected to a differential pressure detector 21 of any suitable type. The differential pressure detector 21 is here shown schematically, and it is understood that the same may be of any known type, such as the slack-diaphragm type or the variable space capacitor type wherein changes in spacing occurring with pressure difference variations are measurable electronically. It will be understood that suitable indicating means or recording means (not shown), or both, will be associated with the detector 21 to provide a reading of the pressure difference in the two conduits 19 and 20.

The apparatus of FIG. 1 may also include a moisture remover 22 positioned in the chamber portion communicating with conduit 20 and remote from the inlet and outlet ports 17 and 18. In its simplest form the moisture remover may be a small cartridge filled with hygroscopic material, although it may take any other form found suitable.

The method of gas analysis entailed in the use of the apparatus shown in FIG. 1 involves the flow of gas through the housing from inlet port 17 to outlet port 18, to and past the semi-permeable membrane 12 through which gas may pass into the other chamber. The gas in the other chamber is rendered free of contained moisture by the moisture diffusion impeding character of the membrane, or by absorption of moisture by hygroscopic member in the other chamber, or by both. The gas pressures in the chambers at the opposite sides of the membrane are then compared by the differential pressure detector which is exposed to the pressure of the moisture-laden gas passing to the outlet port 18 and to the moisture-free gas which has permeated through the membrane. The reading of the differential pressure detector 21 may be calibrated in terms of moisture content.

The method above described may be practiced by passing gases continuously from the inlet to the outlet and entails gas flow through the membrane in both directions as variations in gas pressure occur. Thus, if a high gas pressure exists, followed by a substantial reduction in gas pressure, so that a pressure exists in the chamber communicating with the inlet and outlet which is less than the pressure in the other chamber, gas may flow from the latter to the former. In such action a purging of both chambers occurs. This permits progressive changes in the reading of the differential pressure detector as water vapor content of the gas sample changes during the continuous testing operation.

It has been found that the device and method will function satisfactorily while the pressure of the gas is very low, such as a sub-atmospheric pressure approaching absolute pressure, to high pressures in the order of 2,000 p.s.i. The method is also effective to measure a wide range of moisture concentration variations. The high range of moisture concentration which can be measured may be in the order of a three percent (3%) concentration of liquid in the gas.

The embodiment of the invention illustrated in FIG. 2 utilizes a cup-shaped housing part 25 having an inlet port 26 and an outlet port 27. A second cup-shaped housing part 28 cooperates with and is assembled with part 25 and is separated therefrom by a membrane 29 of gas-pervious hygroscopic or moisture-absorbing character. The margins of the two housing parts 25 and 28 are provided with grooves intermediate the width thereof and extending continuously therearound within which sealing rings or gaskets 30 are confined and compressed to provide a gas-tight seal around the chamber at each side of the membrane.

The membrane 29 preferably projects from the housing parts 25 and 28 continuously therearound and is suitably clamped or positioned in outwardly spaced relation to the housing parts. The membrane clamping means may include multiple spaced outwardly projecting parts 31 on each of the housing parts 25 and 28 which carry offset end portions 32. Complementary clamping rings 33 are carried by the respective housing parts 25 and 28 by means of projections 34 confronting the offset ends 32 or projections 31. An electrical insulating member 35 is positioned between confronting parts 32 and 34. The confronting parts 32 and 34 are connected by securing means 36, such as nuts and bolts, and are electrically insulated from one another by insulation grommets 37, insulating one of the connected parts 32 and 34 from the securing means extending therethrough. The complementary clamping rings 33 are electrodes and are connected to opposite leads of an electrical circuit 38 having an electrical power source 39.

A conduit 40 communicates with the chamber formed in housing part 25, as at the outlet passage 27. A conduit 41 communicates with the chamber formed in the housing part 28. The two conduits 40 and 41 are connected to a differential pressure detector 42. A moisture absorber 43 may be enclosed within the chamber within housing part 28, but its use is optional.

The method entailed in the operation of the device shown in FIG. 2 involves the flow of gas through housing part 25 from inlet 26 for impingement upon the membrane 29 followed by exhaust at outlet 27 with attendant application of gas pressure upon the detector 41 through the conduit 40. The membrane 29 is pervious to gas which enters the chamber of housing part 28. The membrane 29 absorbs the moisture content of the gas which permeates therethrough so that the gas in the chamber of housing part 28 is substantially free of moisture content. If desired, further removal of moisture in the chamber of housing part 28 can be effected by the provision therein of the moisture absorber 43. The pressure of the moisture free gas in the housing part 28 is transmitted through the conduit 41 to the differential pressure detector 42 for measurement of moisture content as a function of the gas pressure differential in lines 40 and 41. Simultaneously with the diffusion of gas through the membrane 29 and the absorption of moisture by that membrane, the absorbed moisture penetrates the entire membrane and may be removed from the membrane by the electrolytic decomposition of the water by the electrode rings 33 upon the margin of the membrane. Alternatively, the electrode rings 33 may be replaced by suitable heating means to vaporize moisture in and thus continuously dry the projecting margin of the membrane. This prevents the accumulation of moisture in the portion of the membrane 29 within the housing which is exposed to the sample gas. Consequently the reading of the differential pressure detector 42 can be calibrated in terms of moisture content andthe calibration can be maintained over long periods of continuous operation despite continuous absorption of moisture by the membrane incident to operation.

The membrane 29 utilized in the FIG. 2 embodiment may be a sintered ceramic member impregnated with hygroscopic material, such as calcium chloride ($CaCl_2$) or magnesium chloride ($MgCl_2$). Membrane 29 shall be sufficiently porous to permit the flow of gas therethrough and the absorption and diffusion of moisture therein. Membrane 29 may be formed in any suitable manner and in one form may be a pressed sintered hygroscopic or ceramic material with an embedded metal screen for reinforcement.

Another embodiment of the invention is illustrated in FIG. 3 and constitutes a combination of the two forms illustrated previously in FIGS. 1 and 2. In this embodiment the housing is formed in three parts including a cup-shaped housing part 50 having an intake port 51 and an outlet port 52. A second cup-shaped housing part 53 is separated from part 50 by a central housing part 54. The housing parts 50 and 54 are preferably provided with confronting projecting ears 55 accommodating securing members 56, such as nuts and bolts, which connect them together. A semi-permeable membrane 57 formed of material similar to that forming membrane 12 of FIG. 1 is clamped between the housing parts 50 and 54, as by seating in marginal step portions thereof. Sealing rings 58 or gaskets are seated in step portions of the housing parts 50 and 54 and extend around the opposite marginal faces of the membrane 57. A conduit 59 communicates with the chamber of housing part 50, as by branching from the outlet 52, and extends to a differential pressure detector 60.

Each of the housing parts 50 and 53 carry multiple spaced projections 61 with offset outer parts 62 to which electrode rings 63 are connected by securing means 64. Insulation means 65 electrically insulate the parts 62 and 63 from each other. The opposite electrodes 63 are connected in branches of a circuit 66 having an electrical power source 67. The electrode rings 63 clamp the outer margins of a hygroscopic or moisture absorbing gas pervious membrane 68 which is positioned between the housing parts 53 and 54 with which it is effectively sealed by means of endless gaskets 69 or sealing rings seated in grooves in the confronting faces or margins of the housing parts 53 and 54.

A conduit 70 carried by the cup-shaped housing part 53 and communicating with the chamber therein is connected to the differential pressure detector 60.

The method entailed in the use of the apparatus of FIG. 3 is as follows: Gas is caused to flow into the chamber of housing part 50 from inlet 51 to outlet 52 and also to flow through the branch conduit 59 to one side of the differential pressure detector 60. Gas permeates through membrane 57 which substantially excludes moisture. The gas then passes through the second membrane 68 whose hygroscopic character absorbs any residual moisture therein so that the gas which enters the chamber of housing part 53 and flows through the conduit 72 and the differential pressure detector 60 is free of moisture. The differential pressure detected at 60 is a measure of the moisture content of the gas.

In this construction it is not essential that the membrane 68 continuously span the chamber and one or more openings may be provided in the portion of the membrane within the housing. In this instance the hygroscopic character of the interrupted membrane 68 will function as before to absorb residual moisture without providing a double barrier to gas flow from the sampling chamber in member 50 to the conduit 70 for application to the differential pressure detector 60. This apparatus, like the others, permits the continuous measurement of the moisture content of gas by continuous flow of gas thereto at inlet 51 and exhaust therefrom at outlet 52.

All embodiments of the invention are characterized by simplicity of construction and operation, continuity of measurement, and highly accurate results over a wide range of pressures and moisture content of sample gases. All embodiments of the invention entail the measurement of the difference of pressure of a sample gas and a moisture-free diffused portion of the same gas and calibration of that measurement in terms of moisture content of the sample gas.

I claim:
1. The method of determining the moisture concentration in gases consisting of the steps of
   diffusing a portion of a sample gas from one chamber to a second chamber through a membrane and removing moisture from the diffused portion,
   measuring the difference in pressure between the sample gas and the diffused gas, and
   heating the edges of the membrane to drive off moisture.
2. Means for measuring the moisture content in gases comprising
   a hollow housing having inlet and outlet ports,
   a gas pervious and moisture absorbent membrane spanning the interior of said housing to define a first chamber and a second chamber,
   said first chamber communicating with both inlet and outlet ports,
   a differential pressure detector,
   means connecting each chamber with said detector, and
   means acting upon the marginal portion of said membrane to remove moisture therein.
3. Apparatus as defined in claim 1, wherein a second moisture pervious membrane spans said first chamber spaced from said first membrane.
4. Apparatus as defined in claim 1, wherein said membrane projects externally of said housing at its margin, and means for electrolytically decomposing moisture in the projecting marginal portion of the membrane.
5. Apparatus as defined in claim 1, wherein said membrane projects externally of said housing at its margin, and means for heating the projecting marginal portion of said membrane to vaporize moisture therein.

References Cited

UNITED STATES PATENTS

| 1,252,975 | 1/1918 | Webster | 73—23X |
| 1,825,024 | 9/1931 | Tandberg | 73—23X |
| 2,045,379 | 9/1936 | Bennett | 73—23 |
| 1,947,303 | 2/1934 | Morgan | 73—23X |
| 3,438,241 | 4/1969 | McKinley | 73—23 |

JAMES J. GILL, Primary Examiner

C. E. SNEE III, Assistant Examiner

U.S. Cl. X.R.

55—16, 158; 73—23